(12) United States Patent
Fontanilla

(10) Patent No.: US 7,093,878 B1
(45) Date of Patent: Aug. 22, 2006

(54) AUTOMOBILE COVER

(76) Inventor: Nel R Fontanilla, 1536 Hemmingway Rd., San Jose, CA (US) 95132

( * ) Notice: Subject to any disclaimer, the term of this patent is extended or adjusted under 35 U.S.C. 154(b) by 0 days.

(21) Appl. No.: 11/097,738

(22) Filed: Apr. 2, 2005

(51) Int. Cl.
    *B60J 11/00* (2006.01)
(52) U.S. Cl. .................. 296/95.1; 296/136.07
(58) Field of Classification Search .......... 296/95.1, 296/136.01, 136.02, 136.07, 136.1, 136.11, 296/136; 150/166; 280/770
See application file for complete search history.

(56) References Cited

U.S. PATENT DOCUMENTS

| | | | |
|---|---|---|---|
| 2,716,433 A * | 8/1955 | Rawlings | 150/166 |
| 2,801,667 A * | 8/1957 | Curran | 150/166 |
| 4,597,608 A * | 7/1986 | Duffy | 296/95.1 |
| 4,842,324 A | 6/1989 | Carden | |
| 4,938,522 A * | 7/1990 | Herron et al. | 296/136.1 |
| 4,948,191 A * | 8/1990 | Cao | 296/95.1 |
| 5,029,933 A | 7/1991 | Gillem | |
| 5,244,245 A | 9/1993 | Kashino | |
| 5,456,515 A | 10/1995 | Dang | |
| 5,490,707 A | 2/1996 | De La Cruz | |
| 5,597,197 A | 1/1997 | Mowar | |
| 5,791,361 A | 8/1998 | Chong | |
| 6,779,827 B1 | 8/2004 | Clark | |

* cited by examiner

*Primary Examiner*—Joseph D. Pape

(57) ABSTRACT

An automobile cover assembly for shielding the roof and windows of an automobile is shown and described. The automobile cover assembly includes a combination of plurality of rigid sheets and a strap that function as a lever type mechanism. When the automobile cover is deployed, the rigid sheets are resting against the windshield of an automobile to keep the windshield portion of the automobile cover in place. The automobile cover assembly further includes a strap having attached to the strap a locking and un-locking device that provides for adjusting a proper tension to the strap to keep the automobile cover tautly placed onto the vehicle.

1 Claim, 5 Drawing Sheets

AUTOMOBILE COVER

FIELD OF INVENTION

This invention relates generally to covers for automobiles, specifically to covers for exterior portions of automobiles to provide protection from the sunlight, snow, ice, frost, and other environmental factors.

BACKGROUND OF THE INVENTION

Extended exposure to sunlight can damage the automobile's interior. Most of the sun's ultraviolet energy penetrates the automobile through the windows. Solar heat energy can build up inside the automobile to extremely high temperature causing damages to objects inside the vehicle. Snow, ice, and frost can build up on the external windows of an automobile that is parked outside overnight during winter season.

Various external covers are known in the art for shielding against sunlight, snow, ice, frost, and other environmental factors. These prior art are disadvantageous in that they are cumbersome, lack the ability to be easily installed and un-installed and difficult to secure in place and susceptible to theft.

Accordingly, an object of the invention is to provide an external automobile cover suitable for providing protection from sunlight, snow, ice, frost, and other environmental factors.

Another object of the invention is to provide an automobile cover that is easily installed and secured in place.

Another object of the invention is to provide an automobile cover that is easily un-installed and then stored in a minimum storage space.

Another object of the invention is to provide an automobile cover that is not prone to theft.

SUMMARY OF THE INVENTION

The above objectives are accomplished according to the present invention by providing an automobile cover that encloses the top portion of a vehicle that includes the roof portion, windshield portion, side windows portion, and rear window portion.

In a preferred embodiment, the current invention provides an automobile cover having plurality of rigid sheets attached into the windshield portion of an automobile cover. When the automobile cover is deployed, the rigid sheets are resting against the windshield of a vehicle to keep the windshield portion of the automobile cover in place. The rigid sheets, a novel feature, are design to overcome the problem of having the windshield portion of an automobile cover from being blown out of place by a strong wind. The automobile cover assembly further includes a strap for securing the automobile cover onto the automobile.

The rigid sheets further provides as a guide in folding the automobile cover in sections for rapid un-installation and storage.

The strap further provides the means for securing the rigid sheets in place by the downward force that is applied between the rigid sheets and the front windshield of the vehicle.

The strap furthermore having attached to the strap a locking and un-locking device that provides the means for adjusting a proper tension to the strap to keep the automobile cover tautly placed onto the vehicle.

DETAILED DESCRIPTION OF THE INVENTION

Figure 1:
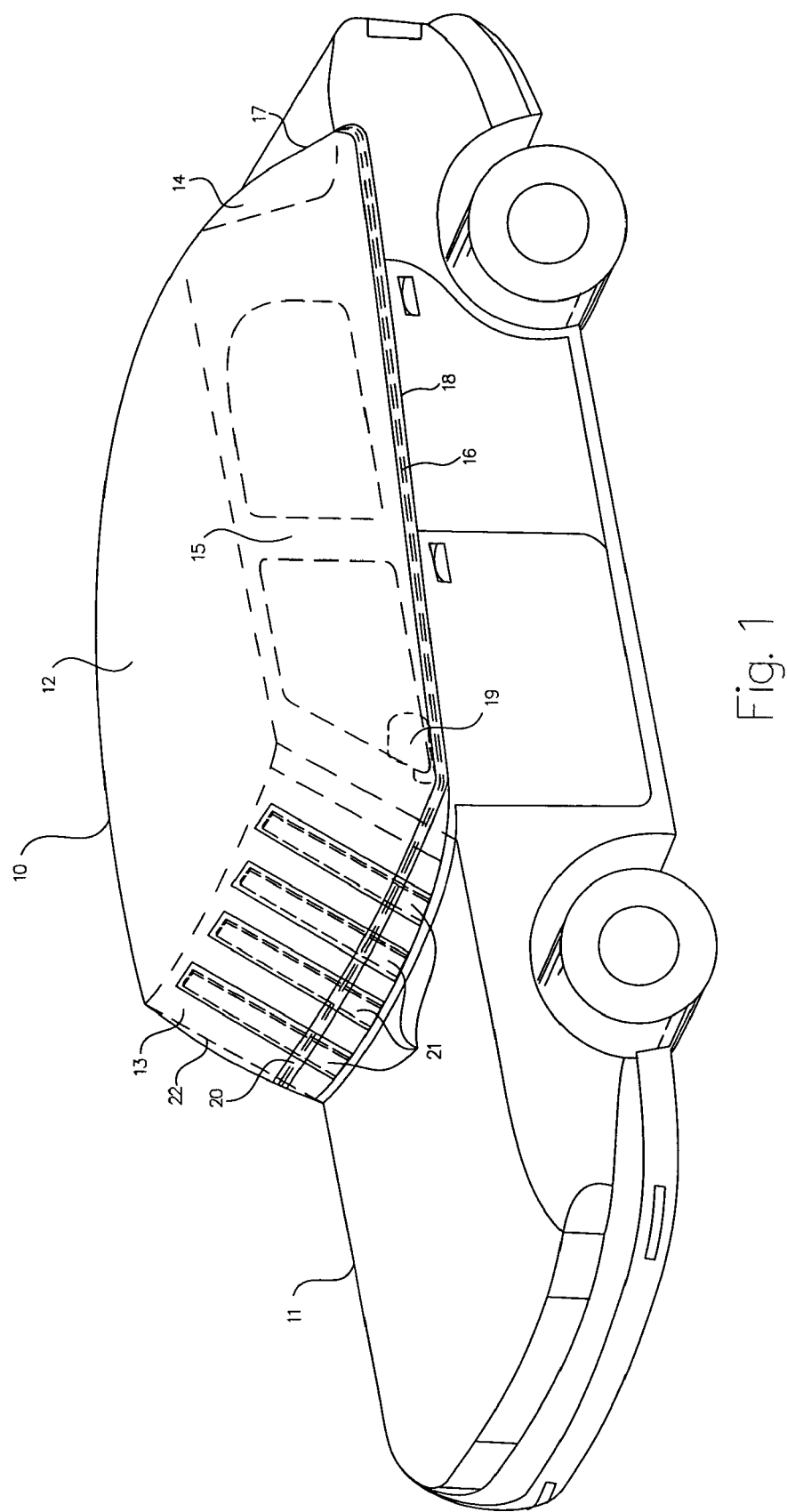
FIG. 1 is a perspective view illustrating an automobile cover of the present invention.

Reference will now be made in detail to the preferred embodiments of the invention. One embodiment of the present invention is illustrated in FIG. 1 showing an automobile cover 10 fully installed on an automobile 11. The automobile cover includes a roof portion 12 covering the automobile roof, windshield portion 13 covers the automobile windshield, rear portion 14 covers the rear window, and side portion 15 covers the side windows of the automobile.

The automobile cover is held in place by the strap 16. The strap encircles the top portion of the vehicle which runs through the lower rear edge portion of the automobile cover 17 and through the two lower-side-edge portions of the automobile cover 18 and passes through the underside of the two side mirrors 19 of the vehicle and through over the windshield portion 20, near the middle of the windshield portion, of the automobile cover.

Figure 2:
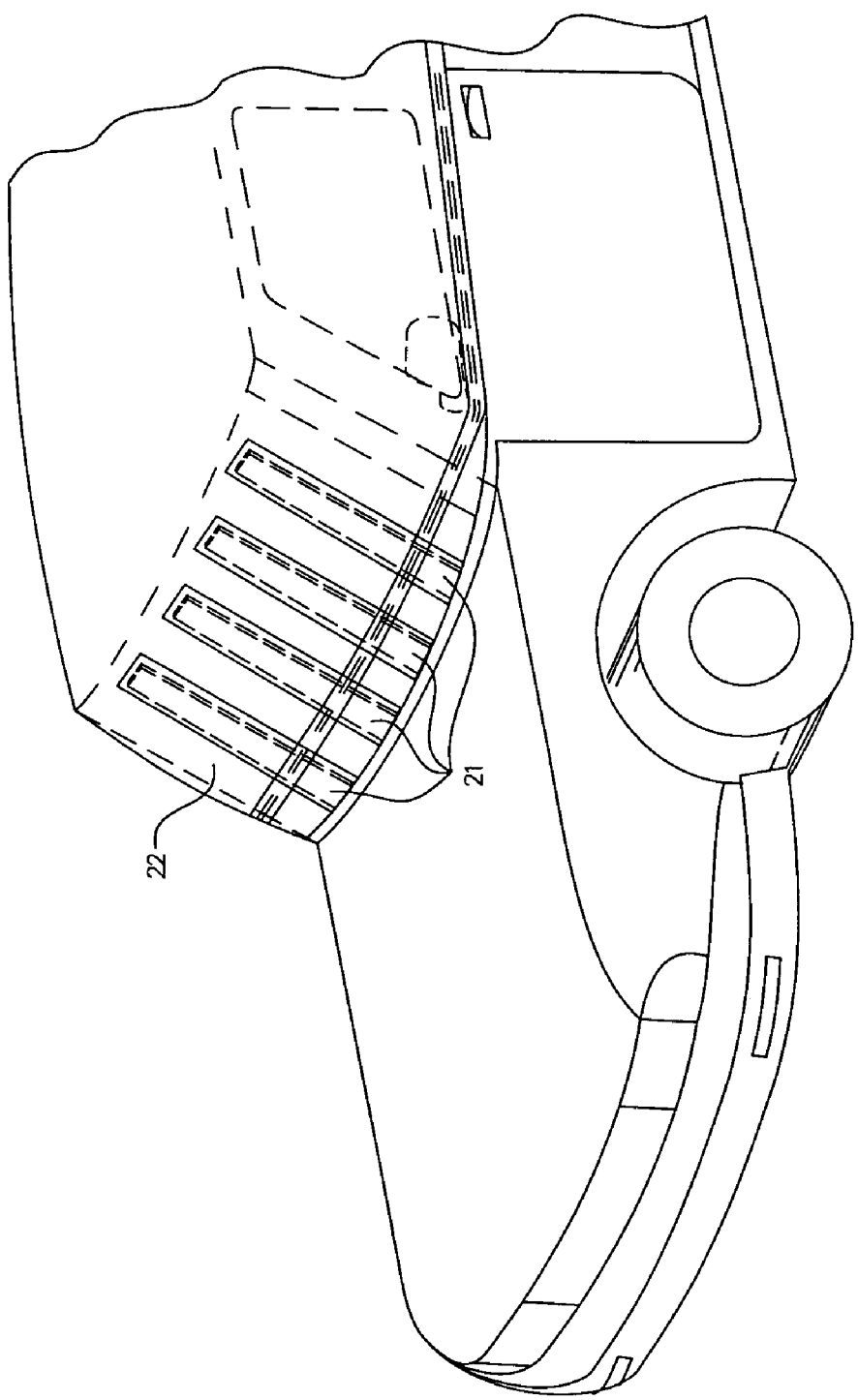
FIG. 2 is a partial perspective view illustrating the attachment and placement of rigid sheets along the windshield portion of the present invention.

FIG. 2 illustrates the placement of the rigid sheets 21. The rigid sheets are inserted into the windshield portion of the automobile cover and when deployed the rigid sheets are resting against the windshield 22 of the vehicle. The rigid sheets provide the means for keeping the windshield portion of the cover in place. The plurality of rigid sheets, a novel feature, serves the purpose of overcoming the problem of having the windshield portion of the automobile cover from being blown out of place by a strong wind. The plurality rigid sheets can be removed from the automobile cover so that the car cover may be placed in washing machines for cleaning.

Figure 3:
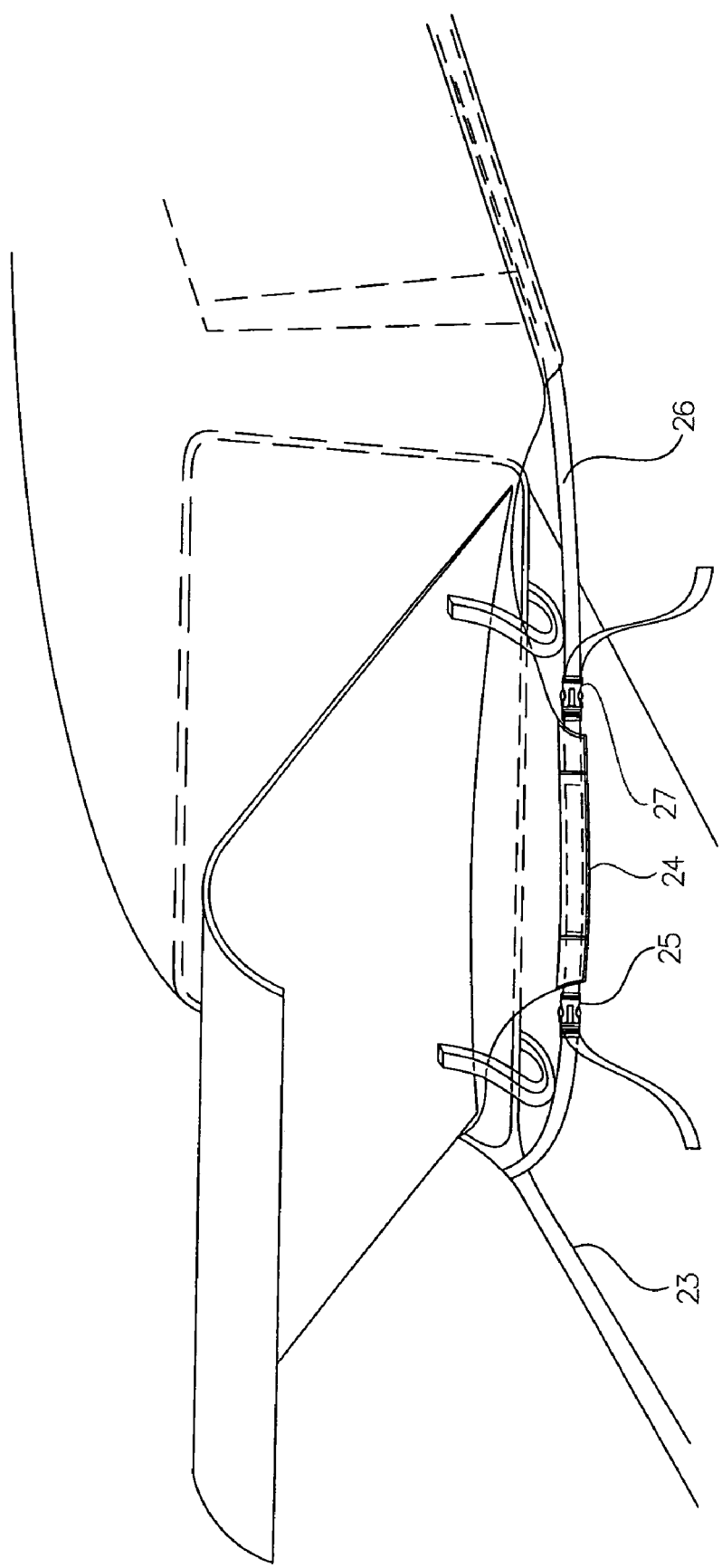
FIG. 3 is a partial perspective view illustrating the attachment of the strap to the rear lower portion of the present invention when deployed underneath the trunk lid of an automobile.

FIG. 3 illustrates the attachment of the strap to the lower edge rear portion of the present invention when deployed underneath the trunk lid 23 of an automobile. The strap is divided into segments. The first segment 24 of the strap is attached at the lower-edge rear portion of the automobile cover. Receptacle type mating locking and un-locking devices 25 are attached at each end of the first segment of the strap. The second segment 26 of the strap is attached at the two lower-side-edge portions of the automobile cover and near the middle of the windshield portion of the automobile cover. Plug type mating locking and un-locking devices 27 are attached at each end of the second segment of the strap. When the trunk of the vehicle is closed, the strap serves for anchoring the automobile cover and securing the automobile cover from theft.

Figure 4:
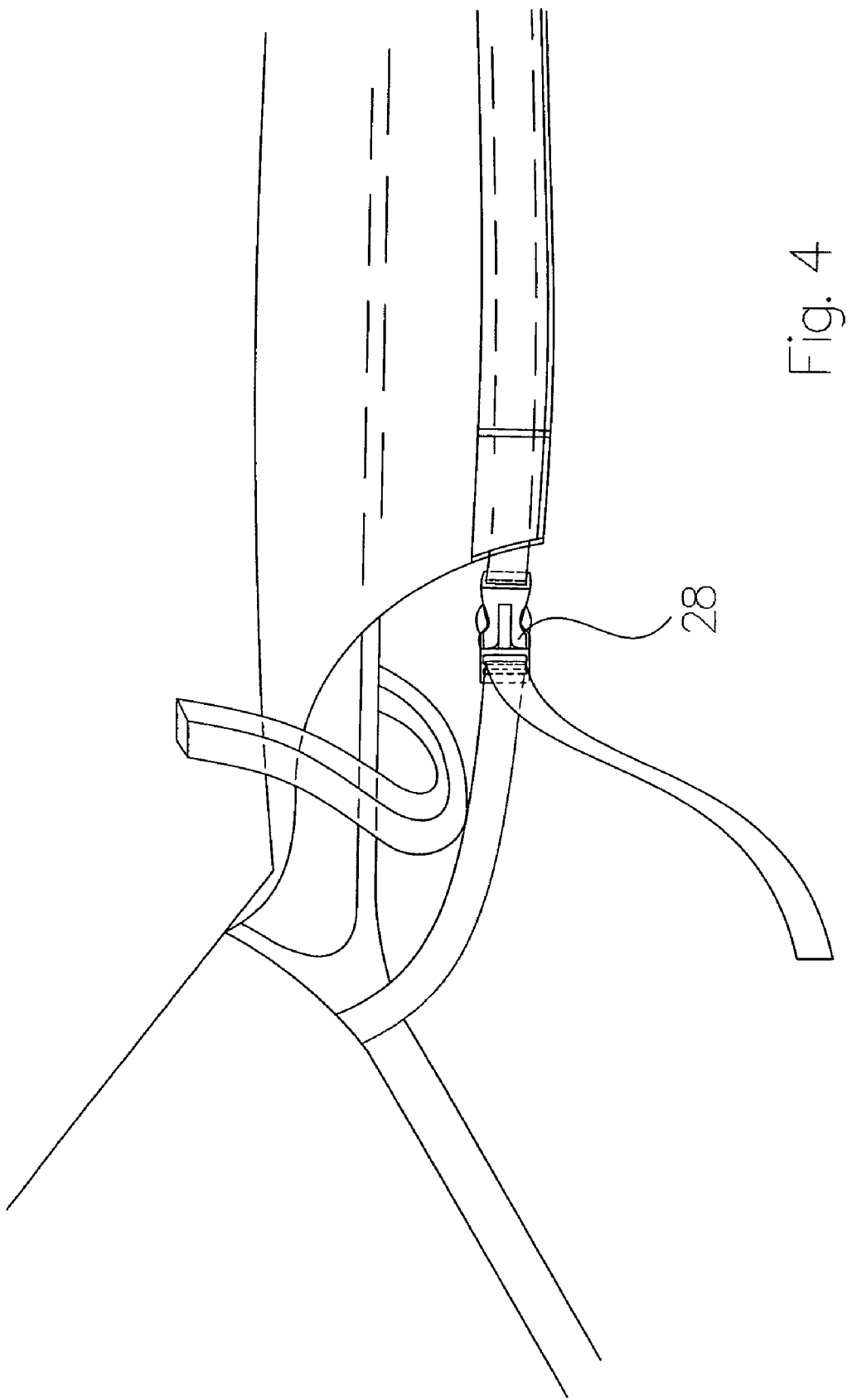
FIG. 4 is a partial perspective view illustrating the attachment of the locking and un-locking device to the strap in the lock position.

FIG. 4 illustrates the attachment of the locking and un-locking device to the strap in the lock position 28. When the strap is in the lock position, the strap can be adjusted to a proper tension so that when the trunk of the vehicle is closed the strap is in snug and constrained tension to keep the automobile cover in place.

Figure 5:
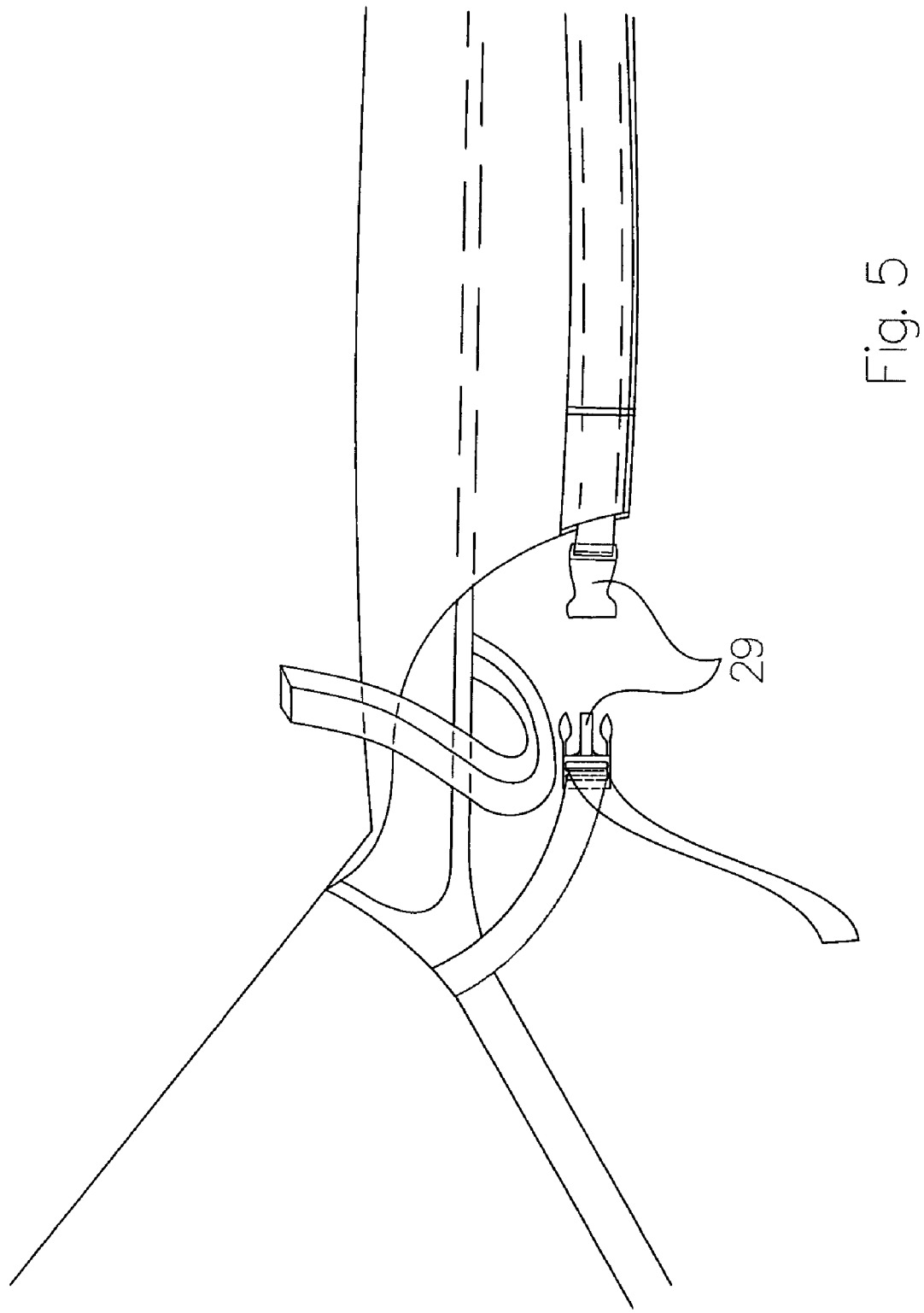
FIG. 5 is a partial perspective view illustrating the attachment of the locking and un-locking device to the strap in the un-lock position.

FIG. 5 illustrates the attachment of the locking and un-locking device to the strap in the un-lock position 29. When the strap is in the un-lock position, the strap is loose and the automobile cover is ready to be un-installed for storage.

What is claimed is:

1. An automobile cover assembly including a roof portion, a windshield portion, a pair of side window portions and a rear window portion, wherein the windshield portion the side window portions and the rear window portion are connected to each other and to the roof portion for covering an upper portion of a passenger area of the automobile and wherein the windshield portion, the side window portions and the rear window portion each include a lower edge, the windshield portion having an upper edge, said assembly further comprising:

a plurality of rigid sheets secured to the windshield portion and extending from the lower edge to the upper edge of the windshield portion, and a non-flexible strap being received in a pocket formed on the cover, the strap extending within the pocket along the lower edges of each side portion and extending across the windshield portion spaced from the lower edge of the windshield portion as to extend over a bottom half of each of said plurality of rigid sheets, the ends of the strap being interconnected near the lower edge of the rear window portion, whereby the strap extending over the plurality of rigid sheets creates a restraining force to resist unwanted movement of the cover assembly in windy conditions.

* * * * *